US 9,041,777 B2

(12) United States Patent
Kim et al.

(10) Patent No.: US 9,041,777 B2
(45) Date of Patent: May 26, 2015

(54) STEREO CAMERA SYSTEM AND METHOD FOR CONTROLLING CONVERGENCE

(75) Inventors: Joo Hyun Kim, Gyeonggi-do (KR); Soon Seok Kang, Gyeonggi-do (KR)

(73) Assignee: SAMSUNG ELECTRO-MECHANICS CO., LTD., Suwon (KR)

( * ) Notice: Subject to any disclaimer, the term of this patent is extended or adjusted under 35 U.S.C. 154(b) by 316 days.

(21) Appl. No.: 13/569,571

(22) Filed: Aug. 8, 2012

(65) Prior Publication Data

US 2013/0050435 A1    Feb. 28, 2013

(30) Foreign Application Priority Data

Aug. 31, 2011 (KR) .................. 10-2011-0087990

(51) Int. Cl.
*H04N 13/00* (2006.01)
*H04N 13/02* (2006.01)

(52) U.S. Cl.
CPC ....... *H04N 13/0018* (2013.01); *H04N 13/0022* (2013.01); *H04N 13/0239* (2013.01); *H04N 13/0246* (2013.01)

(58) Field of Classification Search
CPC .......... H04N 13/0022; H04N 13/0081; H04N 13/0246; H04N 13/0018; H04N 13/0007; H04N 13/004; H04N 13/0203; H04N 5/23287; G06T 2207/10021; G06T 7/002
USPC ......... 348/47, 333.07; 359/466, 472; 382/154
See application file for complete search history.

(56) References Cited

U.S. PATENT DOCUMENTS

| | | | | |
|---|---|---|---|---|
| 6,384,859 B1* | 5/2002 | Matsumoto et al. | ............ | 348/43 |
| 6,414,709 B1* | 7/2002 | Palm et al. | ........................ | 348/47 |
| 6,549,650 B1* | 4/2003 | Ishikawa et al. | .............. | 382/154 |
| 6,677,939 B2* | 1/2004 | Uchiyama | ...................... | 345/419 |
| 7,386,226 B2* | 6/2008 | Miyoshi et al. | .................. | 396/89 |
| 7,437,066 B2* | 10/2008 | Miyoshi et al. | ................. | 396/324 |
| 7,659,921 B2* | 2/2010 | Aoyama | ........................ | 348/135 |
| 8,428,342 B2* | 4/2013 | Tian et al. | ....................... | 382/154 |
| 8,472,702 B2* | 6/2013 | Mashitani et al. | ............. | 382/154 |
| 8,704,932 B2* | 4/2014 | Hulyalkar et al. | ............. | 348/335 |
| 8,768,044 B2* | 7/2014 | Hong et al. | ..................... | 382/154 |
| 8,791,989 B2* | 7/2014 | Ushio et al. | ...................... | 348/51 |
| 8,860,786 B2* | 10/2014 | Tsukagoshi | ...................... | 348/43 |
| 2001/0045979 A1* | 11/2001 | Matsumoto et al. | ............. | 348/43 |
| 2007/0248260 A1* | 10/2007 | Pockett | .......................... | 382/154 |
| 2008/0112616 A1* | 5/2008 | Koo et al. | ....................... | 382/171 |
| 2009/0243823 A1* | 10/2009 | Takahashi | ...................... | 340/435 |
| 2009/0244263 A1* | 10/2009 | Saito | ............................... | 348/47 |
| 2010/0002073 A1* | 1/2010 | Robinson et al. | ............... | 348/42 |

(Continued)

FOREIGN PATENT DOCUMENTS

KR    10-2007-0030501    3/2007

*Primary Examiner* — Brian Yenke (57) ABSTRACT

Disclosed herein are a stereo camera system and a method for controlling convergence, including: a camera unit photographing both-eyes images; a filter unit filtering signal values of pixels for each line for any one of the both-eyes images along a line direction to detect a reference line of any one image; a line memory unit storing data for the reference line and a reference line of the other one image corresponding to the reference line; and a convergence control unit calculating the image control amount so as to align convergences of the both-eyes images by performing a comparison operation on the data for the reference lines and generating an optimal synthesis image of the both-eyes images by applying the image control amount.

14 Claims, 5 Drawing Sheets

(56) References Cited

U.S. PATENT DOCUMENTS

| | | | |
|---|---|---|---|
| 2010/0220175 A1* | 9/2010 | Claydon et al. | 348/43 |
| 2010/0231691 A1* | 9/2010 | Lee | 348/47 |
| 2011/0187834 A1* | 8/2011 | Morifuji et al. | 348/47 |
| 2011/0249117 A1* | 10/2011 | Yoshihama et al. | 348/135 |
| 2011/0279647 A1* | 11/2011 | Nishimura et al. | 348/43 |
| 2011/0279652 A1* | 11/2011 | Eggert et al. | 348/47 |
| 2011/0279654 A1* | 11/2011 | Ueda et al. | 348/49 |
| 2012/0063669 A1* | 3/2012 | Hong et al. | 382/154 |
| 2012/0113228 A1* | 5/2012 | Konno et al. | 348/47 |
| 2012/0154543 A1* | 6/2012 | Kasuga | 348/47 |
| 2012/0182397 A1* | 7/2012 | Heinzle et al. | 348/47 |
| 2012/0236124 A1* | 9/2012 | Aoki | 348/47 |
| 2012/0236128 A1* | 9/2012 | Ueda et al. | 348/49 |
| 2012/0249746 A1* | 10/2012 | Cornog et al. | 348/47 |
| 2012/0262553 A1* | 10/2012 | Chen et al. | 348/47 |
| 2012/0293614 A1* | 11/2012 | Ikeda et al. | 348/42 |
| 2012/0300028 A1* | 11/2012 | Kimoto et al. | 348/43 |
| 2012/0320155 A1* | 12/2012 | Suh et al. | 348/43 |
| 2013/0010084 A1* | 1/2013 | Hatano | 348/47 |
| 2013/0071012 A1* | 3/2013 | Leichsenring et al. | 382/154 |
| 2013/0083168 A1* | 4/2013 | Kim et al. | 348/47 |
| 2013/0093859 A1* | 4/2013 | Nakamura | 348/51 |
| 2013/0100254 A1* | 4/2013 | Morioka et al. | 348/47 |
| 2013/0215234 A1* | 8/2013 | Lim et al. | 348/47 |
| 2014/0078265 A1* | 3/2014 | Ohba et al. | 348/47 |

\* cited by examiner

STEREO CAMERA SYSTEM AND METHOD FOR CONTROLLING CONVERGENCE

CROSS REFERENCE(S) TO RELATED APPLICATIONS

This application claims the benefit under 35 U.S.C. Section 119 of Korean Patent Application Serial No. 10-2011-0087990, entitled "Stereo Camera System and Method for Controlling Convergence" filed on Aug. 31, 2011, which is hereby incorporated by reference in its entirety into this application.

BACKGROUND OF THE INVENTION

1. Technical Field

The present invention relates to a stereo camera system and a method for controlling convergence, and more particularly, to a stereo camera system and a method for controlling convergence capable of improving system performance such as improvement in an image implementation speed, prevention of an image breaking phenomenon, or the like, and simplifying the system, by reducing calculations for controlling convergence and applying a line memory.

2. Description of the Related Art

With the distribution of a 3D TV, producing various contents has been demanded from a consumer. To this end, a development of a stereo camera has been actively conducted.

At present, the most efficient method used in mobile devices use a binocular camera (stereo camera). However, the binocular camera has a problem in dizziness and eye fatigue due to a misalignment between convergence of a user and convergence of a camera.

Figure 1:
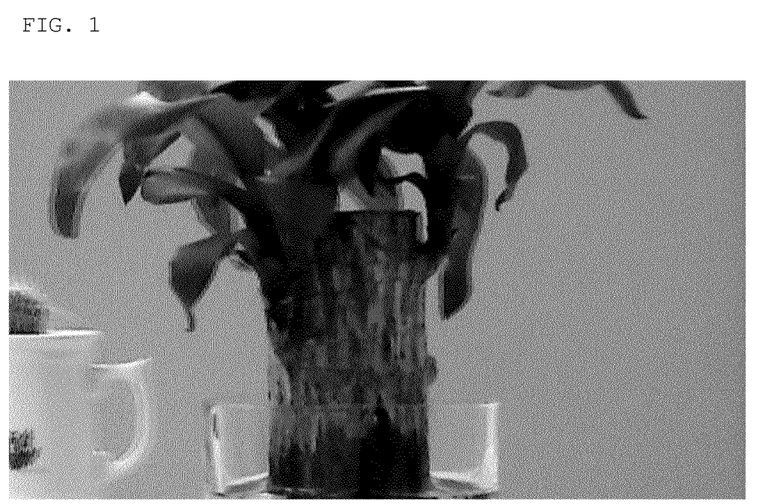
FIG. 1 is a diagram schematically showing a 3D image as an image implemented through a stereo camera system when convergence of both-eyes images is aligned.

In more detail, an image shown in FIG. 1 corresponds to a left image and a right image sequentially arranged in a pixel by pixel by using the binocular camera. In this case, a format type used in an autostereoscopic 3D display panel is displayed on a screen. As shown in FIG. 1, when the convergences are aligned, left and right images of central objects are the same so as to be converged to a display device, such that a user can recognize the same distance, thereby reducing dizziness and fatigue.

Figure 2:
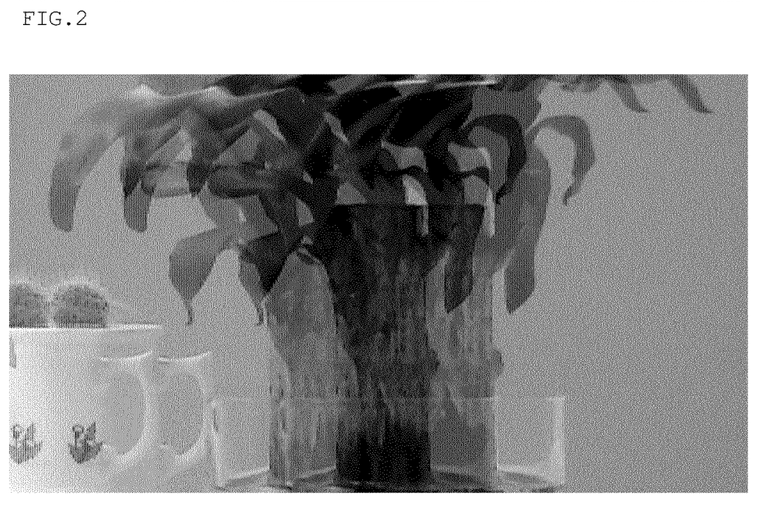
FIG. 2 is a diagram schematically showing a 3D image as an image implemented through a stereo camera system when convergence of both-eyes images is not aligned.

When the user fixes or moves to the camera to other objects, positions of the objects are changed and thus, the convergence positions of the focused objects are changed. In this case, as shown in FIG. 2, when the convergences are not calibrated, disparity of the focused object is large, such that the focused objects look like being further protruded or recessed as compared with a 3D display device. Therefore, there is a problem in that the user focusing a screen center of the display device may feel dizziness and fatigue.

In order to improve the problem, the method for calibrating convergence according to the related art as disclosed in KR Laid-Open Patent Publication No. 2007-0030501 is a method that stores both-eyes images photographed by a binocular camera in a frame memory and shifts the stored both-eyes images to the left and right to calibrate the convergence.

However, a method of moving all the images using the frame memory is a method of calculating correlation of left and right images by cropping all the both-eyes images stored and as a result, the method increases calculations to make it difficult to use real-time calibration such as photographing moving pictures, or the like, and increase used power consumption and uses a large-capacity external frame memory to increase complexity of hardware and increase a system size.

SUMMARY OF THE INVENTION

An object of the present invention is to provide a stereo camera system and a method for controlling convergence capable of providing a 3D image by performing a convergence calibration process of both-eyes images using a line shifting method, thereby reducing calculations for controlling the convergence so as to improve system performance such as improvement in an image implementation speed, prevention of an image breaking phenomenon, or the like.

Another object of the present invention is to provide a stereo camera system and a method for controlling convergence capable of simplifying a system, such as low power implementation, miniaturization, or the like, by applying a line shifting method at the time of calibrating convergence to replacing an existing frame memory with a line memory.

According to an exemplary embodiment of the present invention, there is provided a stereo camera system, including: a camera unit photographing both-eyes images; a filter unit filtering signal values of pixels for each line for any one of the both-eyes images along a line direction to detect a reference line of any one image; a line memory unit storing data for the reference line and a reference line of the other one image corresponding to the reference line; and a convergence control unit calculating the image control amount so as to align convergences of the both-eyes images by performing a comparison operation on the data for the reference lines and generating an optimal synthesis image of the both-eyes images by applying the image control amount.

The camera unit may include a left camera photographing a left image of the both-eyes images and a right camera photographing a right image thereof.

The filer unit may include: a high pass filter (HPF) receiving signal values corresponding to each pixel for each line for any one image to generate output values; and a detector detecting the reference line of any one image by accumulating absolute values of the output values for each line so as to calculate a maximum accumulated value.

The line memory unit may include: a first line memory storing the data for the reference line of the any one image; and a second line memory storing the data for the reference line of the other one image.

The data may include signal values corresponding to each pixel of each reference line.

The convergence control unit may include: a convergence calculator calculating the image control amount; and an image control unit generating an optimal synthesis image of the both-eyes images.

The convergence calculator may shift and calculate an accumulated value of an absolute value for a difference between signal values corresponding to each pixel of a predetermined region of the reference line of the other one image and signal values corresponding to each pixel of number corresponding to the predetermined region of the reference line of the any one image by one pixel along the reference line of the any one image by one pixel in the predetermined region unit to calculate the image control amount corresponding to the number of pixels moving to a point in which the accumulated value of the absolute value is minimum, and the image control unit may shift the any one image by the number of moving pixels corresponding to the image control amount based on the other one image to generate the optimal synthesis image.

The stereo camera system may further include a display unit displaying the optimal synthesis image to the outside.

According to an exemplary embodiment of the present invention, there is provided a method for controlling convergence of a stereo camera system, including: photographing both-eyes images; detecting reference lines of the both-eyes images; storing data for the reference lines of the both-eyes images; and controlling convergence to calculate the image control amount so as to align the convergences of the both-eyes images by performing the comparison operation on the data and generate the optimal synthesis image of the both-eyes images by applying the image control amount.

The photographing of the images may photograph the left-eye image and the right-eye image by the left camera and the right camera, respectively.

The detecting of the reference lines may include: filtering so as to generate output values by inputting signal values corresponding to each pixel for each line for any one of the both-eyes images to a high pass filter; and calculating so as to detect the reference lines corresponding to the maximum accumulated value by accumulating absolute values of the output values for each line to calculate a maximum accumulated value.

The storing may store the data for the reference lines of the both-eyes images in a first line memory and a second line memory, respectively.

The controlling of the convergence may include calculating the image control amount by performing comparison operation on data for the reference lines of the both-eyes images; and generating the optimal synthesis image by matching the both-eyes images according to the image control amount.

The calculating may shift and calculate an accumulated value of an absolute value for a difference between signal values corresponding to each pixel of a predetermined region of the reference line of the other one image of the both-eyes images and signal values corresponding to each pixel of number corresponding to the predetermined region of the reference line of the any one image by one pixel along the reference line of the any one image by one pixel in the predetermined region unit to calculate the image control amount, and the controlling may shift the any one image by the number of moving pixels corresponding to the image control amount based on the other one image to generate the optimal synthesis image.

The method for controlling convergence of the stereo camera may further include displaying the optimal synthesis image to the outside.

DESCRIPTION OF THE PREFERRED EMBODIMENTS

Hereinafter, exemplary embodiments will be described in greater detail with reference to the accompanying drawings.

In the following descriptions, same reference numerals and signs are used for the same elements when they are depicted in different drawings and an additional description thereof will be omitted.

First, an exemplary embodiment of a stereo camera system according to the present invention will be described with reference to FIGS. 3 to 5.

Figure 3:
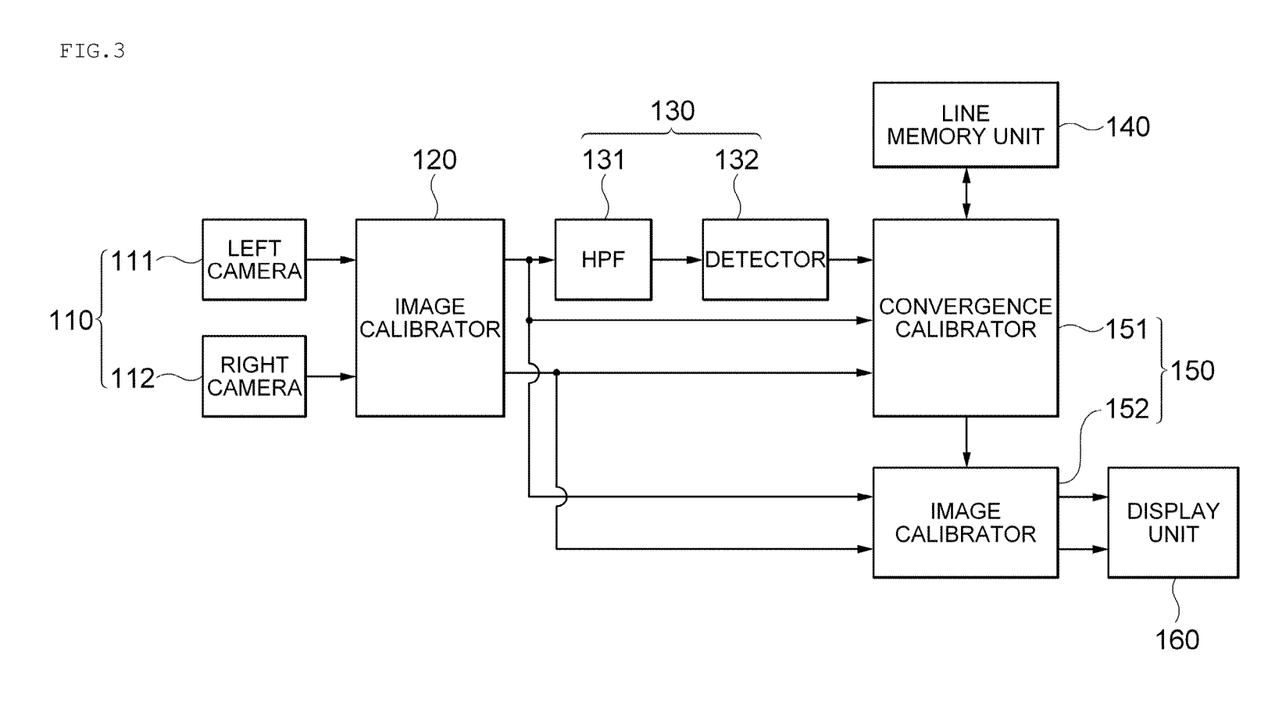
FIG. 3 is a configuration diagram schematically showing a stereo camera system according to an exemplary embodiment of the present invention.
Figure 4:
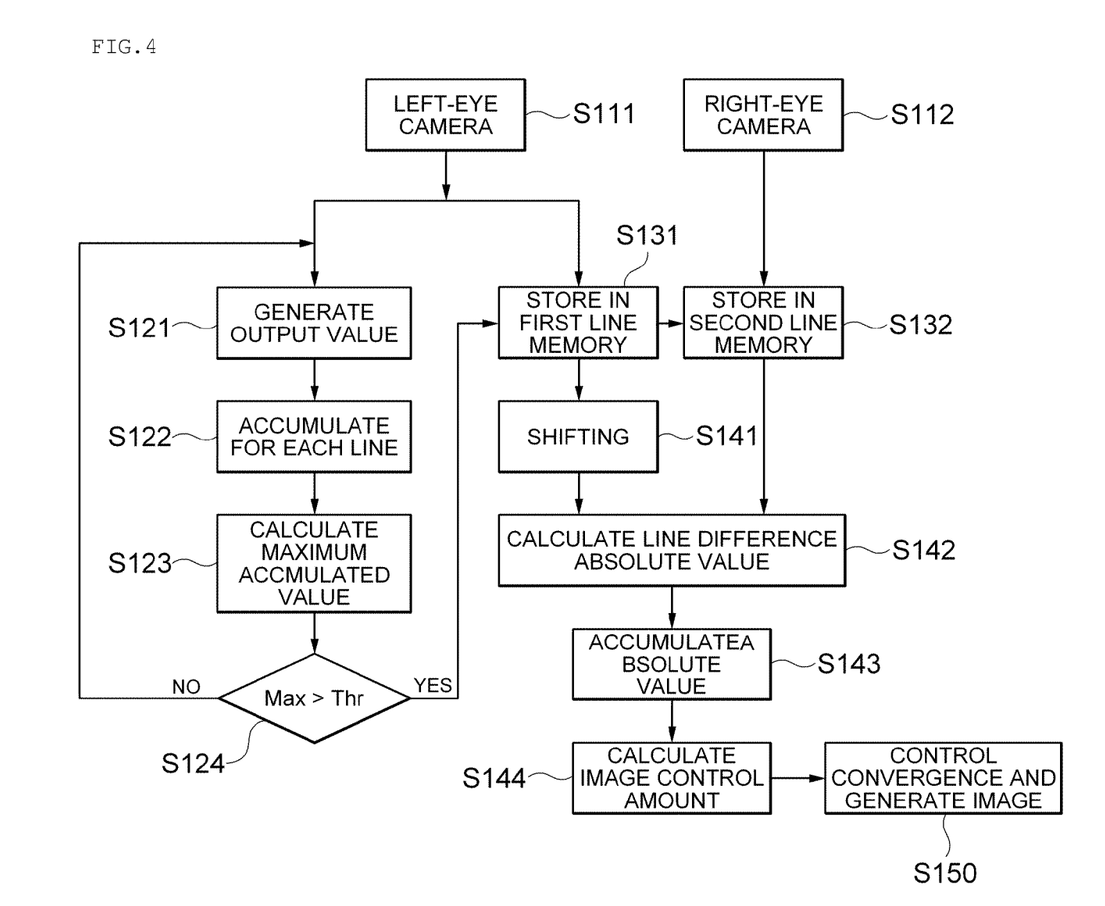
FIG. 4 is a flow chart schematically showing a method for controlling convergence of a stereo camera system according to an exemplary embodiment of the present invention.
Figure 5:
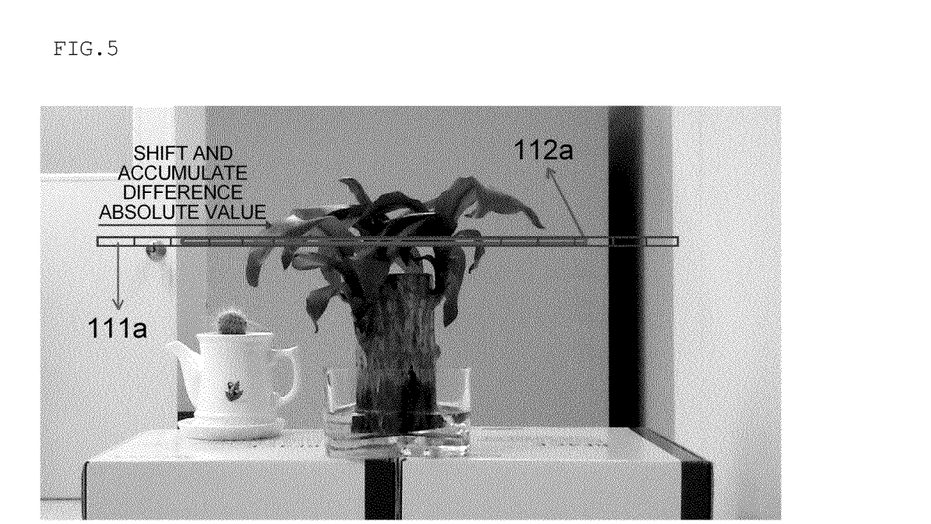
FIG. 5 is a diagram for describing a process of controlling convergence in the method for controlling convergence of the stereo camera system according to the exemplary embodiment of the present invention.

FIG. 3 is a configuration diagram schematically showing a stereo camera system according to an exemplary embodiment of the present invention, FIG. 4 is a flow chart schematically showing a method for controlling convergence of a stereo camera system according to an exemplary embodiment of the present invention, and FIG. 5 is a diagram for describing a process of controlling convergence in the method for controlling convergence of the stereo camera system according to the exemplary embodiment of the present invention.

Referring to FIGS. 3 to 5, an exemplary embodiment of the stereo camera system according to the exemplary embodiment of the present invention may be configured to include a camera unit 110, a filter unit 130, a line memory unit 140, and a convergence control unit 150.

Further, the stereo camera system according to the exemplary embodiment of the present invention may be configured to include a stereo calibrator 120 disposed between the camera unit 110 and the filter unit 130.

In addition, the stereo camera system according to the exemplary embodiment of the present invention may be configured to include a display unit 160 that displays an optimal synthesis image of which the convergence is calibrated through the convergence control unit 150, that is, a 3D image of which the convergence is calibrated to the outside.

In more detail, the camera unit 110 may photograph both-eyes images and may include a left camera 111 photographing a left-eye image of the both-eyes images and a right camera 112 photographing a right-eye image thereof.

The stereo calibrator 120 analyzes the both-eyes images acquired through the camera unit 110, that is, the left camera 111 and the right camera 112 to calibrate distortion, warping, color difference, or the like, of the left and right images. In this case, the calibration may be performed by a method, or the like, such as "comparison of stereo matching algorithms for mobile robots" of Annika Kuhl.

The filter unit 130 filters signal values of pixels along line directions for each line for any one (hereinafter, collectively referred to as a left-eye image) of the both-eyes images to detect a reference line of the left-eye image.

To this end, the filter unit 130 may be configured to include a high pass filter (HPF) 131 that receives signal values corresponding to each pixel for each line for the left-eye image to generate output values and a detector 132 that detects a reference line of the left-eye image by calculating a maximum accumulated value through an accumulation of absolute values of the output values for each line.

The line memory unit 140 may store data for the reference line of the left-eye image and the reference line (hereinafter, collectively referred to as a right-eye image) of the other one image corresponding to the left-eye image.

To this end, the line memory unit 140 may include a first line memory that stores the data for the reference line of the left-eye image and a second line memory that stores the data for the reference line of the right-eye image. In this configuration, the data may include the signal values corresponding to each pixel of each reference line.

The convergence control unit 150 may calculate an image control amount aligning the convergences of the both-eyes images by performing comparison operation on the data for the reference lines and generate the optimal synthesis images of the both-eyes images by applying the image control amount.

In this case, the convergence control unit 150 may include a convergence calculator 151 calculating the image control amount and an image control unit 152 generating the optimal synthesis image of the both-eyes images.

In this case, the convergence calculator 151 shifts and calculates the accumulated values of the absolute values for a difference between the signal values corresponding to each pixel of a predetermined region in the reference line of the right-eye image and the signal values corresponding to each pixel of number corresponding to the predetermined region in the reference line of the left-eye image by one pixel in the predetermined region along the reference line of the left-eye image, thereby calculating the image control amount corresponding to the number of pixels moving to a place where the accumulated values of the absolute values are minimized.

In addition, the image control unit 152 may shift the left-eye image by the number of moving pixels corresponding to the image control amount based on the right-eye image to generate the optimal synthesis image, that is, the 3D image of which the convergence is controlled in the line shifting method.

The 3D image formed as configured above of which the convergence is controlled may be displayed to the outside through the display unit 160 such as LCD or LED.

Next, the method for controlling convergence of the stereo camera system according to the exemplary embodiment of the present invention as described above will be described below.

Referring to FIGS. 3 to 5, the method for controlling convergence of the stereo camera system according to the exemplary embodiment of the present invention may include photographing both-eyes images (S111 and S112), detecting the reference line of the both-eyes images (S121 to S124), storing the data for the reference line of the both-eyes images (S131 and S132), and controlling convergence to calculate the image control amount so as to align the convergences of the both-eyes images by performing the comparison operation on the data and generate the optimal synthesis image of the both-eyes images by applying the image control amount (S141 to 5144 and S150).

In more detail, the left-eye image is first photographed by the left camera 111 (S11) and the right-eye image is photographed by the right camera 112 (S112).

Further, the both-eyes images photographed by the left and right cameras may calibrate the distortion, wrapping, color difference, or the like, of the left and right images by the stereo calibrator 120.

In this case, the image is calibrated by the stereo calibrator 120 and then, a parallel axis of the left-eye image and the right-eye image may be aligned with each other, which may mean that the left and right signals on the same line have the same data.

Then, the high pass filter 131 performs the filtering process of cropping any one of the both-eyes images, that is, the central portion of the left-eye image and receiving the signal values corresponding to each pixel for each line in a horizontal direction to generate the output values (S121).

The exemplary embodiment of the present invention discloses that the filtering process is performed using the left-eye image, but is not limited thereto. Therefore, the exemplary embodiment of the present invention may perform the filtering process using the right-eye image.

Further, the detector 132 accumulates the absolute values for the output values for each line to calculate the maximum accumulated value and perform the operation process of detecting the line corresponding to the maximum accumulated value as the reference line (S122 to S123). That is, the largest line in which the accumulated value for the absolute values of the output values becomes a reference line. The largest accumulated value is a line having the largest amount of edge component, that is, the largest amount of data information in the cropped image. The exemplary embodiment of the present invention uses the reference line having the largest amount of data information to perform the convergence control of the left-eye image and the right-eye image.

As an example, as shown in the following Table 1, when a contrast signal of the image signal of the left-eye image is input to the high pass filter as the following input value, the output values are equal to the following output values if it is assumed that coefficients from the high pass filter use [−1, 0, 1]. In this case, the coefficients from the high pass filter may use any published ones.

TABLE 1

| | Number | | | | | | | | | | | |
|---|---|---|---|---|---|---|---|---|---|---|---|---|
| | 0 | 1 | 2 | 3 | 4 | 5 | 6 | 7 | 8 | 9 | 10 | ... |
| Input | 10 | 10 | 10 | 10 | 10 | 10 | 10 | 10 | 10 | 10 | 10 | ... |
| Output | — | 0 | 0 | 0 | 0 | 0 | 0 | 0 | 0 | 0 | ... | ... |

That is, the output values from the high pass filter may be calculated as follows.

Output of Number 1=(Input Value of Number 0*First Value of Coefficients)+(Input Value of Number 1*Second Value of Coefficients)+(Input Value of Number 0*Third Value of Coefficient)= {10*(−1)}+{10*0}+{10*1}=0.

In other words, the input values as in the above Table 1, that is, the case in which all the signal values corresponding to each pixel of any one line among the cropped image portion of the left-eye image are 10 corresponds to a case in which an object such as a flat wall surface no having the edge information in the input image is photographed. In this case, since there is no edge information that is the high frequency component, all the output values from the high pass filter are 0.

Except for the above case, as in the following Table 2, when the signal values corresponding to each pixel of any one line of the left-eye image depend on the following Table 2, the output values from the high pass filter may have values shown in the following Table 2.

TABLE 2

| | Number | | | | | | | | | | | |
|---|---|---|---|---|---|---|---|---|---|---|---|---|
| | 0 | 1 | 2 | 3 | 4 | 5 | 6 | 7 | 8 | 9 | 10 | ... |
| Input | 10 | 50 | 60 | 100 | 10 | 10 | 10 | 100 | 100 | 10 | 10 | ... |
| Output | — | 50 | 50 | −50 | −90 | 0 | 90 | 90 | −90 | −90 | ... | ... |
| Absolute Value | — | 50 | 50 | 50 | 90 | 0 | 90 | 90 | 90 | 90 | ... | |

Further, when all the absolute values of the output values from the high pass filter are accumulated, the accumulated values become 600 and the accumulated values for the absolute values of the output values from the high pass filter for each line of the cropped portion of the left-eye image may be calculated.

Next, it can be appreciated that the line having the largest accumulated value of the accumulated values, that is, the maximum accumulated value (Max) is the line having the largest amount of edge information in the left-eye image. In this case, the line is just the reference line.

In this case, when the maximum accumulated value (Max) is equal to or smaller than a setting value (Thr), the maximum accumulated value is an invalid value, that is, has too small amount of edge information and thus, is inappropriate to control the convergence, such that the maximum accumulated value means a value that is not performed.

Thereafter, the data for the reference line of the both-eyes images are stored in the first line memory and the second line memory, respectively, (S131 and S132).

That is, the line having the maximum accumulated value among the left-eye images is stored in the first line memory as the reference line of the left-eye image and the line of the right-eye image corresponding to the reference line of the left-eye image is stored in the second line memory as the reference line of the right-eye image.

Next, the convergences of the both-eyes images may be calibrated in real time by performing the process of performing the comparison operation on the data for the reference line of the both-eyes images and calculating the image control amount and the process of generating the optimal synthesis image of which the convergences are aligned by matching the both-eyes images according to the image control amount.

In this case, the image control amount may be calculated by calculating the accumulated values of the absolute values for the difference between the signal values corresponding to each pixel of a predetermined region 112a of the reference line of the right-eye image and the signal values corresponding to each pixel of a region 111a corresponding to the predetermined region 112a of the reference line of the left-eye image and calculating each accumulated value by moving the predetermined line 111a of the reference line of the left-eye image by one pixel along the reference line of the left-eye image in the state in which the predetermined region 112a of the reference line of the right-eye image is fixed through the above process (S141 and S142) and then detecting the pixel shifting amount up to the moving point having the minimum accumulated value. Further, this process may also be applied by changing the right-eye image and the left-eye image.

As an example, when the signal values (Right) corresponding to each pixel of the predetermined region 112a of the reference line of the right-eye image and the signal values (Left) corresponding to each pixel of the predetermined region 111a of the reference line of the left-eye image are input as in the following Table 3, the difference value (Diff) and the absolute of the difference value may have values shown in the following Table 3 and the accumulated valued of the absolute value may be 8.

TABLE 3

| Right | 0 | 0 | 0 | 0 | 1 | 2 | 1 | 0 | 0 | 0 | 0 | 0 | 0 |
|---|---|---|---|---|---|---|---|---|---|---|---|---|---|
| Left | 0 | 1 | 2 | 1 | 0 | 0 | 0 | 0 | 0 | 0 | 0 | 0 | 0 |
| Diff. | 0 | −1 | −2 | −1 | 1 | 2 | 1 | 0 | 0 | 0 | 0 | 0 | 0 |
| Absolute | 0 | 1 | 2 | 1 | 1 | 2 | 1 | 0 | 0 | 0 | 0 | 0 | 0 |

Further, the pixel shifting amount up to a time when the accumulated value is minimum after the accumulated value of the absolute value for the difference value is calculated by moving the signal value (Left) corresponding to each pixel of the predetermined region 111a of the reference line of the left-eye image to the right by one pixel becomes the image control amount for aligning the convergences of the left-eye image and the right-eye image as described above.

That is, the following Table 4 calculates the difference value (Diff.) and the absolute value of the difference value by moving the signal values (Left) corresponding to each pixel of the predetermined region 111a of the reference line of the left-eye image to the right by 3 pixels in the state of the above Table 3 and the difference value (Diff.) and the absolute value of the difference value are shown in the following Table 4, such that the accumulated value of the absolute value for the difference value is 0. In this state, the image control amount of the left-eye image for the right-eye image may be 3 pixels.

Therefore, when the left-eye images shifts by 3 pixels based on the right-eye image, the optimal synthesis image in which the convergences of the right-eye image and the left-eye image are aligned with each other, that is, the 3D image of which the convergences of the both-eyes images are aligned with each other may be obtained (S150).

TABLE 4

| Right | 0 | 0 | 0 | 0 | 1 | 2 | 1 | 0 | 0 | 0 | 0 | 0 | 0 | | |
|---|---|---|---|---|---|---|---|---|---|---|---|---|---|---|---|
| Left | | | | 0 | 1 | 2 | 1 | 0 | 0 | 0 | 0 | 0 | 0 | 0 | 0 |
| Diff. | | | | 0 | 0 | 0 | 0 | 0 | 0 | 0 | 0 | 0 | 0 | | |
| Absolute | | | | 0 | 0 | 0 | 0 | 0 | 0 | 0 | 0 | 0 | 0 | | |

Thereafter, when the 3D image in which the convergences of the optimal synthesis image, that is, the both-eyes images are aligned with each other is displayed to the outside through the display unit, the 3D image of which the convergence is aligned with each other may be implemented.

Figure 6:
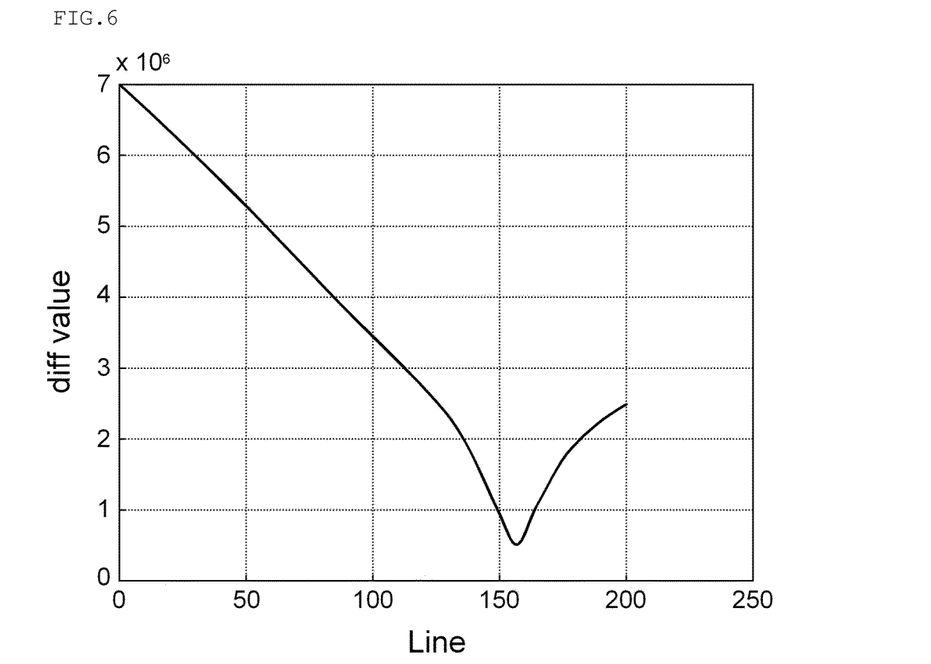
FIG. 6 is a graph showing a moving difference accumulated value using an image shifting method according to the related art.
Figure 7:
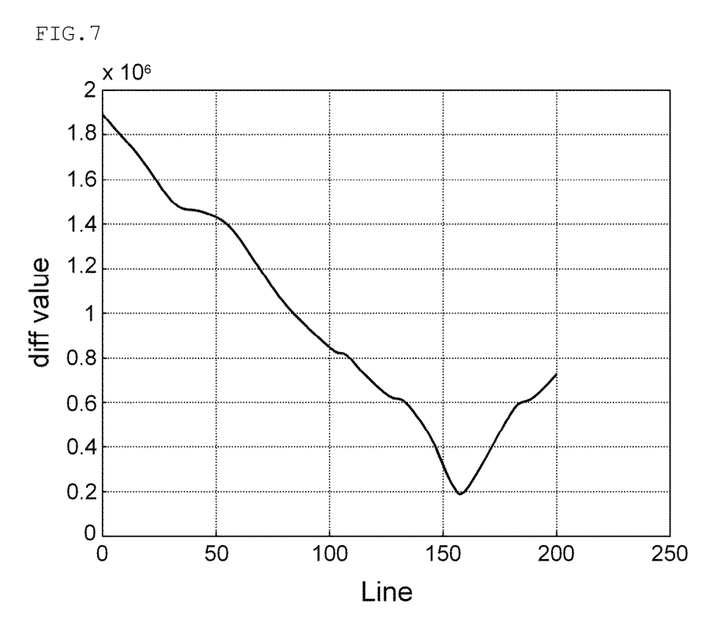
FIG. 7 is a graph showing the moving difference accumulated value using the method for controlling convergence of the stereo camera system according to the exemplary embodiment of the present invention.

Meanwhile, FIG. 6 is a graph showing a moving difference accumulated value using an image shifting method according to the related art and FIG. 7 is a graph showing the moving difference accumulated value using the method for controlling convergence of the stereo camera system according to the exemplary embodiment of the present invention. In this case, an X axis shows the number of moving pixels of the image and a Y axis shows the accumulated value for the absolute value of the difference value between the fixed image and the moving image among the both-eyes images.

The case of FIG. 6 has the smallest accumulated value in 158 pixel shifting and the case of FIG. 7 also has the smallest accumulated value in 158 pixel shifting.

That is, the stereo camera system through the line shifting method and the method for controlling convergence according to the exemplary embodiments of the present invention reduces the calculations for controlling convergence by performing the convergence calibration process of the both-eyes image by the line shifting method while maintaining accuracy as compared with the method for moving all the images according to the related art, thereby improving the image implementation speed, increasing the system performance such as the prevention of the image breaking phenomenon, or the like, and performing the real-time calibration such as the moving picture photographing, or the like.

In addition, the stereo camera system and the method for controlling convergence according to the exemplary embodiments of the present invention can replace the line memory to simplify the system such as the low power implementation, the miniaturization, or the like.

As set forth above, the stereo camera system and the method for controlling convergence according to the exemplary embodiments of the present invention can improve the system performance, such as the improvement in an image implementation speed, the prevention of an image breaking phenomenon, or the like, by reducing the calculations through the convergence calibration process using the line shifting method.

In addition, the stereo camera system and the method for controlling convergence according to the exemplary embodiments of the present invention can replace the existing frame memory with the line memory, thereby simplifying the system.

While the present invention has been shown and described in connection with the embodiments, it will be apparent to those skilled in the art that modifications and variations can be made without departing from the spirit and scope of the invention as defined by the appended claims.

What is claimed is:

1. A stereo camera system, comprising:
   a camera unit photographing both-eyes images;
   a stereo calibrator aligning a parallel axis of each of the both-eyes images with each other;
   a filter unit filtering signal values of pixels for each line for any one of the both-eyes images along a line direction, calculating a maximum accumulated value by accumulating absolute values of the filtering signal values of pixels for each line, and detecting a line corresponding to the maximum accumulated value as a reference line of any one image, after aligning the parallel axis of each of the both-eyes images with each other;
   a line memory unit storing data for the reference line and a reference line of the other one image corresponding to the reference line; and
   a convergence control unit calculating the image control amount so as to align convergences of the both-eyes images by performing a comparison operation on the data for the reference lines and generating an optimal synthesis image of the both-eyes images by applying the image control amount.

2. The system according to claim 1, wherein the camera unit includes a left camera photographing a left image of the both-eyes images and a right camera photographing a right image thereof.

3. The system according to claim 1, wherein the filer unit includes:
   a high pass filter (HPF) receiving signal values corresponding to each pixel for each line for any one image to generate output values; and
   a detector detecting the reference line of any one image by accumulating absolute values of the output values for each line so as to calculate a maximum accumulated value.

4. The system according to claim 1, wherein the line memory unit includes:
   a first line memory storing the data for the reference line of the any one image; and
   a second line memory storing the data for the reference line of the other one image.

5. The system according to claim 4, wherein the data include signal values corresponding to each pixel of each reference line.

6. The system according to claim 1, wherein the convergence control unit includes:
   a convergence calculator calculating the image control amount; and
   an image control unit generating an optimal synthesis image of the both-eyes images.

7. The system according to claim 6, wherein the convergence calculator shifts and calculates an accumulated value of an absolute value for a difference between signal values corresponding to each pixel of a predetermined region of the reference line of the other one image and signal values corresponding to each pixel of number corresponding to the predetermined region of the reference line of the any one image by one pixel along the reference line of the any one image by one pixel in the predetermined region unit to calculate the image control amount corresponding to the number of pixels moving to a point in which the accumulated value of the absolute value is minimum, and
   the image control unit shifts the any one image by the number of moving pixels corresponding to the image control amount based on the other one image to generate the optimal synthesis image.

8. The system according to claim 1, further comprising a display unit displaying the optimal synthesis image to the outside.

9. A method for controlling convergence of a stereo camera system, comprising:
   photographing both-eyes images;
   aligning a parallel axis of each of the both-eyes images with each other;
   generating output values by inputting signal values corresponding to each pixel for each line for any one of the both-eyes images;
   detecting reference lines of the both-eyes images corresponding to the maximum accumulated value by accumulating absolute values of the output values for each line to calculate a maximum accumulated value;
   storing data for the reference lines of the both-eyes images; and
   controlling convergence to calculate the image control amount so as to align the convergences of the both-eyes images by performing the comparison operation on the data and generate the optimal synthesis image of the both-eyes images by applying the image control amount.

10. The method according to claim 9, wherein the photographing of the images photographs the left-eye image and the right-eye image by the left camera and the right camera, respectively.

11. The method according to claim 9, wherein the storing stores the data for the reference lines of the both-eyes images in a first line memory and a second line memory, respectively.

12. The method according to claim 9, wherein the controlling of the convergence includes calculating the image control amount by performing comparison operation on data for the reference lines of the both-eyes images; and
   generating the optimal synthesis image by matching the both-eyes images according to the image control amount.

13. The method according to claim 12, wherein the calculating shifts and calculates an accumulated value of an absolute value for a difference between signal values corresponding to each pixel of a predetermined region of the reference line of the other one image of the both-eyes images and signal values corresponding to each pixel of number corresponding to the predetermined region of the reference line of the any one image by one pixel along the reference line of the any one image by one pixel in the predetermined region unit to calculate the image control amount, and the controlling shifts the any one image by the number of moving pixels corresponding to the image control amount based on the other one image to generate the optimal synthesis image.

14. The method according to claim 9, further comprising displaying the optimal synthesis image to the outside.

* * * * *